US012786883B2

(12) United States Patent
Dauneria et al.

(10) Patent No.: US 12,786,883 B2
(45) Date of Patent: Nov. 3, 2026

(54) CONTROLLING DEVICE USAGE WITH RESPECT TO SLICES

(71) Applicant: Telefonaktiebolaget LM Ericsson (publ), Stockholm (SE)

(72) Inventors: Ankur Dauneria, New Delhi (IN); George Foti, Dollard des Ormeaux (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 286 days.

(21) Appl. No.: 18/569,868

(22) PCT Filed: Jun. 15, 2021

(86) PCT No.: PCT/IB2021/055280
§ 371 (c)(1),
(2) Date: Dec. 13, 2023

(87) PCT Pub. No.: WO2022/263885
PCT Pub. Date: Dec. 22, 2022

(65) Prior Publication Data
US 2024/0276384 A1 Aug. 15, 2024

(51) Int. Cl.
*H04W 52/02* (2009.01)
*H04L 41/122* (2022.01)
(Continued)

(52) U.S. Cl.
CPC ....... *H04W 52/0258* (2013.01); *H04L 41/122* (2022.05); *H04L 41/40* (2022.05); (Continued)

(58) Field of Classification Search
CPC . H04W 52/0225–0235; H04W 52/0251–0267; H04W 52/0277; H04W 52/00–60; H04L 41/22
See application file for complete search history.

(56) References Cited

U.S. PATENT DOCUMENTS 9,407,755 B1 * 8/2016 Koller ............... H04W 52/0216
11,595,286 B2 * 2/2023 Ramamurthi ........ H04B 17/309
(Continued)

FOREIGN PATENT DOCUMENTS

EP 3289810 B1 7/2018
EP 3444788 A1 2/2019
(Continued)

OTHER PUBLICATIONS

International Search Report and Written Opinion dated Mar. 7, 2022 for International Application No. PCT/IB2021/055280 filed Jun. 15, 2021; consisting of 10 pages.
(Continued)

*Primary Examiner* — Brendan Y Higa
(74) *Attorney, Agent, or Firm* — Weisberg I.P. Law, P.A.

(57) ABSTRACT

A method, apparatus, and system are provided for power savings. In one embodiments, a method implemented at a user equipment, UE, includes obtaining a power saving rule, the power saving rule being based at least in part on power consumption metrics related to use of at least one application on at least one slice by the UE and/or by a device connected to the UE; and determining that a power saving slice should be used for a first application of the at least one application and/or the device connected to the UE based at least in part on (i) the obtained power saving rule and (ii) a current power state at the UE and/or at the device connected to the UE; and establishing a protocol data unit, PDU, session using the power saving slice.

20 Claims, 5 Drawing Sheets

(51) Int. Cl.
*H04L 41/40* (2022.01)
*H04L 41/5009* (2022.01)

(52) U.S. Cl.
CPC ..... *H04L 41/5016* (2013.01); *H04W 52/0251* (2013.01); *H04W 52/0277* (2013.01)

(56) References Cited

U.S. PATENT DOCUMENTS

| | | | | |
|---|---|---|---|---|
| 11,595,895 | B2 * | 2/2023 | Jagannatha | H04W 52/0225 |
| 11,751,142 | B2 * | 9/2023 | Zhu | H04W 52/0277 370/318 |
| 2004/0180701 | A1 | 9/2004 | Livet et al. | |
| 2008/0165714 | A1 * | 7/2008 | Dettinger | H04W 52/0261 370/311 |
| 2009/0098914 | A1 | 4/2009 | Martin-Cocher et al. | |
| 2012/0210150 | A1 * | 8/2012 | de Lind van Wijngaarden | G06F 9/4893 713/320 |
| 2014/0095601 | A1 * | 4/2014 | Abuelsaad | G06F 9/5061 709/204 |
| 2015/0220127 | A1 * | 8/2015 | Kukoyi | G06F 11/3062 713/340 |
| 2016/0066276 | A1 * | 3/2016 | Su | H04W 72/02 370/252 |
| 2016/0242119 | A1 * | 8/2016 | Shedletsky | H04W 52/0258 |
| 2019/0182702 | A1 | 6/2019 | Wang et al. | |
| 2020/0213949 | A1 | 7/2020 | Bria et al. | |
| 2021/0136680 | A1 * | 5/2021 | Browne | H04W 52/0203 |
| 2021/0359916 | A1 * | 11/2021 | Yamamoto | H04L 41/22 |
| 2022/0264469 | A1 * | 8/2022 | Zhu | H04W 52/0235 |
| 2022/0279444 | A1 * | 9/2022 | Jagannatha | H04W 52/0225 |
| 2023/0085363 | A1 * | 3/2023 | Kim | H04W 48/18 455/411 |
| 2023/0164881 | A1 * | 5/2023 | Velev | H04W 76/00 370/329 |
| 2023/0171639 | A1 * | 6/2023 | Kim | H04W 48/18 370/229 |
| 2023/0276337 | A1 * | 8/2023 | Hui | H04L 45/851 370/328 |
| 2023/0276352 | A1 * | 8/2023 | Wang | H04W 76/10 455/434 |
| 2024/0064776 | A1 * | 2/2024 | Wang | H04W 76/14 |
| 2024/0187991 | A1 * | 6/2024 | Rydén | H04W 24/10 |
| 2024/0259934 | A1 * | 8/2024 | Choe | H04W 48/12 |
| 2026/0075497 | A1 * | 3/2026 | Hui | H04W 40/02 |

FOREIGN PATENT DOCUMENTS

| | | | |
|---|---|---|---|
| WO | 2016173676 | A1 | 11/2016 |
| WO | 2019066688 | A1 | 4/2019 |

OTHER PUBLICATIONS

3GPP TS 23.502 V17.0.0; 3rd Generation Partnership Project; Technical Specification Group Services and System Aspects; Procedures for the 5G System (5GS); Stage 2 (Release 17); Mar. 2021; consisting of 646 pages.

Singh, D.; 5G's Healthcare Impact: 1 Billion Patients with Improved Access in 2030; STL Partners, Executive Briefing; Oct. 2019; consisting of 39 pages.

Communication pursuant to Article 94(3) EPC dated Jul. 22, 2026 for Application No. 21734510.7, consisting of 5 pages.

* cited by examiner

CONTROLLING DEVICE USAGE WITH RESPECT TO SLICES

CROSS-REFERENCE TO RELATED APPLICATIONS

This application is a Submission Under 35 U.S.C. § 371 for U.S. National Stage Patent Application of International Application Number: PCT/IB2021/055280, filed Jun. 15, 2021 entitled "CONTROLLING DEVICE USAGE WITH RESPECT TO SLICES," the entirety of which is incorporated herein by reference.

TECHNICAL FIELD

The present disclosure relates to wireless communications and, in particular, to controlling device usage with respect to slices.

BACKGROUND

As electronic devices, such as user equipments (UEs), become increasingly deployed and mobile, there continues to be a desire to improve power efficiency and to thereby extend battery life.

Today, there exist many arrangements to monitor, manage and extend battery levels. For example, when the battery level of some UEs falls below a threshold, a battery saver mode activates at the UE which restricts communication at the UE to conserve battery power. Such battery saver modes can also be triggered upon user selection, via a user interface (UI), e.g., settings menu.

As another example, when a Bluetooth device (such as wireless headphones) connect to a UE, it is possible to obtain secondary device specific power level information (e.g., 100% battery power for a connected wireless headphone) in addition to the main UE power level information.

As yet another example, when a UE is connected to an external power source for charging purposes, an emitting beep sound exists today also. That is, it is possible to detect that a UE is connected to an external power source at the UE.

UEs are also becoming increasingly sophisticated. Thus, there is a need to provide additional power savings arrangements to prolong the battery life of UEs, even with the addition of new UE functionality.

SUMMARY

Some embodiments of the present disclosure advantageously provide methods, apparatuses and systems related to controlling device usage with respect to network slices (also referred to herein as "slices").

According to an aspect of the present disclosure, a method implemented in a user equipment, UE, is provided. The method includes obtaining a power saving rule, the power saving rule being based at least in part on power consumption metrics related to use of at least one application on at least one slice by the UE and/or by a device connected to the UE; determining that a power saving slice should be used for a first application of the at least one application and/or the device connected to the UE based at least in part on (i) the obtained power saving rule and (ii) a current power state at the UE and/or at the device connected to the UE; and establishing a protocol data unit. PDU, session using the power saving slice.

In some embodiments, the current power state is based on at least one of: a current battery power level at the UE and/or the device; and whether the UE and/or the device is currently being charged by an external power source. In some embodiments, the method further includes detecting that the current battery power level meets or exceeds a pre-determined threshold power level; and establishing the PDU session using the power saving slice as a result of the detection. In some embodiments, the method further includes providing a user interface configured to allow a user of the UE to select the power saving slice; receiving a user input via the user interface to select the power saving slice; and establishing the PDU session using the selected power saving slice.

In some embodiments, the providing the user interface configured to allow the user to select the power saving slice is a result of detecting that the current battery power level meets or exceeds a pre-determined threshold power level. In some embodiments, establishing the PDU session using the power saving slice includes determining to terminate a first existing PDU session that is using a non-power saving slice; and re-establishing a second PDU session using the power saving slice, the terminated and re-established PDU sessions being associated with the first application and/or the device connected to the UE. In some embodiments, establishing the PDU session using the power saving slice comprises determining to initiate a new PDU session for the first application and/or the device connected to the UE; and establishing the new PDU session using the power saving slice, the new PDU session being associated with the first application and/or the device connected to the UE.

In some embodiments, obtaining the power saving rule comprises as a result of the detection that the current battery power level meets or exceeds a pre-determined threshold power level, obtaining the power saving rule that is associated to the pre-determined threshold power level that is met or exceeded. In some embodiments, determining that the power saving slice should be used for the first application comprises identifying a non-power saving slice currently being used by a first existing PDU session for the first application that is associated to the power saving rule; and switching the first application from the non-power saving slice to the power saving slice according to the power saving rule by terminating the first existing PDU session that is using the non-power saving slice and re-establishing a second PDU session using the power saving slice.

In some embodiments, the power saving slice is associated with a lower power consumption at the UE and/or the device connected to the UE, as compared to a power consumption associated with the non-power saving slice. In some embodiments, the power saving slice is associated with the lower power consumption based at least in part on the power consumption metrics. In some embodiments, determining that the power saving slice should be used for the first application comprises identifying a non-power saving slice currently being used by a first existing PDU session for the first application that is associated to the power saving rule; and determining to terminate the first existing PDU session that is using the non-power saving slice and to forgo re-establishment of a second PDU session for the application to reduce power consumption at the UE and/or the device connected to the UE.

In some embodiments, determining that the power saving slice should be used for the first application comprises identifying a non-power saving slice currently being used by a first existing PDU session for the first application that is associated to the power saving rule; and determining to terminate a second existing PDU session for a second application using the non-power saving slice to reduce power consumption at the UE and/or the device connected to the UE, while continuing the first existing PDU session for the first application using the non-power saving slice. In some embodiments, the power saving rule at least one of: is a local UE rule; is based further on at least one of a UE route selection policy, URSP, from a policy control function, PCF, and a URSP pre-configured in the UE; and is application-specific and slice-specific.

In some embodiments, the power consumption metrics are related to historical use by the UE and/or the device of the at least one application on the at least one slice. In some embodiments, the method further includes continuously monitoring the power consumption metrics of the UE and/or the device; and modifying the power saving rule based at least in part on a result of the monitoring. In some embodiments, the device is a Bluetooth device connected to the UE and the power consumption metrics are related to historical use of the at least one application on the at least one slice by the Bluetooth device.

In some embodiments, as a result of the current battery power level of the Bluetooth device meeting or exceeding a pre-determined threshold power level, the determining that the power saving slice should be used for the first application comprises identifying a non-power saving slice currently being used by a first existing PDU session for the first application that is associated to the power saving rule; and one of: switching the first application from using the non-power saving slice to using the power saving slice to reduce power consumption at the Bluetooth device; terminating the first existing PDU session that is using the non-power saving slice and re-establishing a second PDU session using the power saving slice to reduce power consumption at the Bluetooth device; determining to terminate the first existing PDU session that is using the non-power saving slice and to forgo re-establishment of a second PDU session for the application to reduce power consumption at the Bluetooth device; and determining to terminate a second existing PDU session for a second application using the non-power saving slice to reduce power consumption at the Bluetooth device, while continuing the first existing PDU session for the first application using the non-power saving slice.

In some embodiments, a user equipment, UE, comprising processing circuitry, the processing circuitry configured to cause the UE to perform any one or more of the methods above is provided.

In some embodiments, a non-transitory computer-readable medium storing computer instructions executable by at least one processor to perform any one or more of the methods above is provided.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
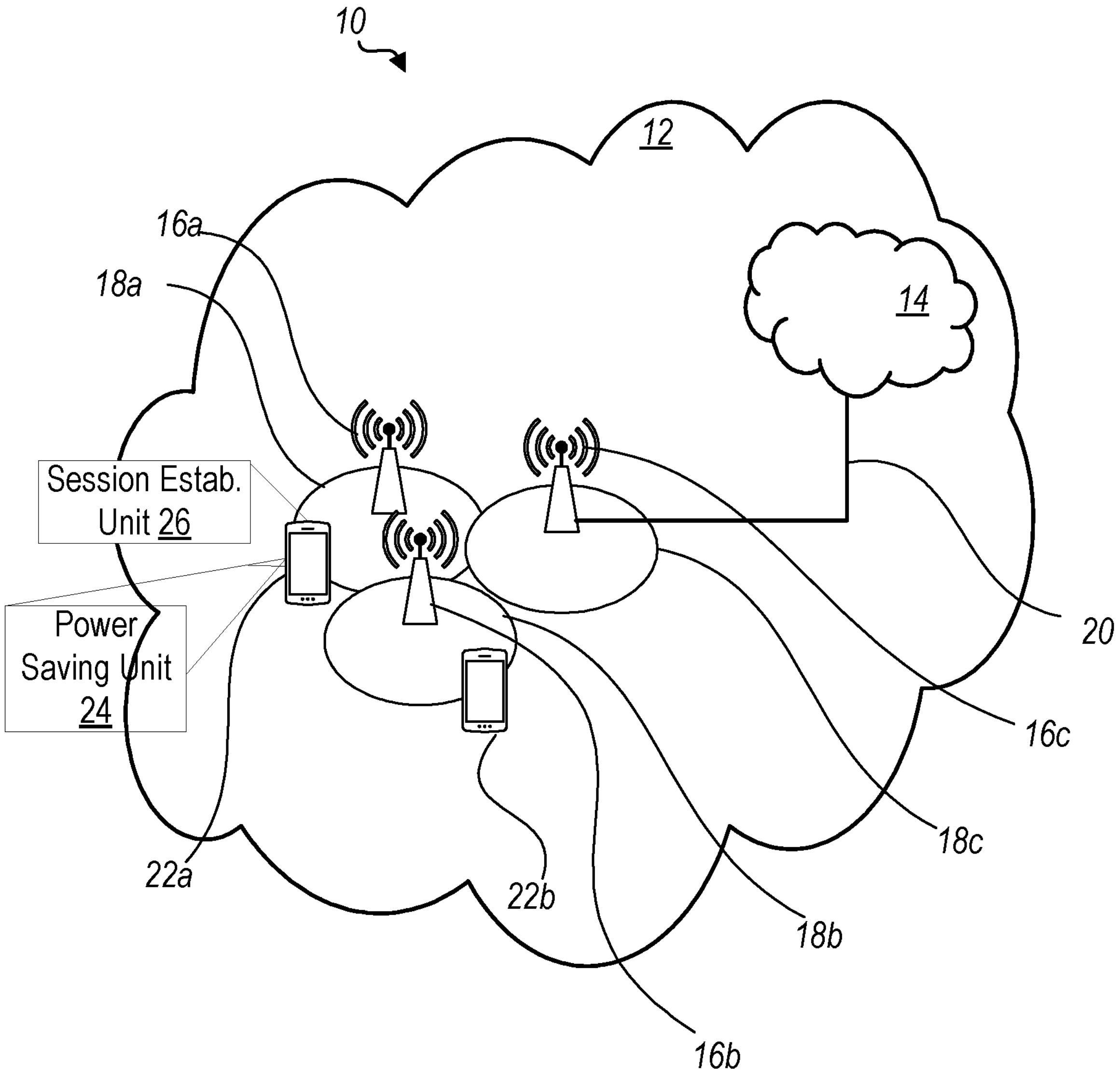
FIG. 1 is a block diagram of an exemplary network architecture illustrating a communication system connected via an intermediate network to a host computer according to the principles in the present disclosure.

As described above, there is a need for additional power savings arrangements to prolong battery life of UEs as compared with known power savings arrangements.

A network slice generally corresponds to a set of network resources which have been allocated to support at least one specific service on the network. Such network resources may include cloud-based communication, computing and memory resources, physical connection and communication resources, wireless radio access resources such as frequency, time and code multi-access resources, telecommunication resources, memory resources and computing resources. A UE seeking access to a service, may connect to a network slice that supports the service. The process of connecting a UE to a service and/or network slice may begin with the UE registering to a network that supports the service. Registration may be initiated through a radio access node that provides a radio connection between the UE and the network.

Some embodiments of the present disclosure provide arrangements for user controlled device usage (e.g., UE, Bluetooth devices and other high power consumption accessories and peripherals, etc.) with respect to specific network slices based on device power level information.

It is quite possible that in the home, many devices are shared among multiple people; thus, wireless Bluetooth devices are most commonly shared devices. It is also quite possible that family members use different slices for different applications/services (voice, music, video) and share set of slices among themselves.

Some embodiments of the present disclosure provide arrangements that may allow a user to configure certain power related preferences, such that the user's wireless Bluetooth headphone when charged should be able to connect to X, Y, Z slices, but when the power level of the Bluetooth headphone drops below some predetermined or user set threshold, then the UE should be able to connect to the X slice only. This way user can set policies for usage of the UE and/or the wireless Bluetooth devices, to conserve Bluetooth device power by restricting its usage towards only certain slices (with services). It is commonly observed that devices shared among different members of a family, face exhausted batteries frequently as one or more members exhaust the battery life. In some embodiments, admin users may limit different users using different slices such that select slices can connect at select power levels. Once power level drops, users of such slice cannot connect other slices, e.g., non-power savings slices. Consider such situation when wireless headphones batteries exhausted towards gaming (slice1) by user1, leaving its batteries insufficient to handle a conference call (slice2) by user2.

In short, some embodiments provide the possibility of an admin user to configure policies at a UE, allowing external secondary device(s) (e.g., Bluetooth devices) with certain power levels to connect or be used towards certain slices/services.

Example Use Cases

In accordance with one use case, the idea is controlling the connection of (sharable) wireless Bluetooth devices (with battery) to a UE (e.g., a Smartphone) based on the external device's power level criteria set by admin policy which dictates that the external device (e.g., Bluetooth headset) can connect to this UE and be usable for communication services of certain slices (e.g., gaming slice) at the UE, if this external device fulfils a set power level criteria. In other words, some embodiments provide for controlling use of such shared devices based on their power levels for certain slices.

As an example, consider that the external device is a wireless Bluetooth headphone, and the primary device is a smartphone UE. The Bluetooth device is connected to the primary device via a Bluetooth connection. The primary device is a subscriber identity module (SIM)-based device which connects to the slices and services. The user uses the Bluetooth device towards communication services over a Bluetooth connection. These telecom communication services come as part of slices which are available at the primary device UE.

Here, the notion is that based on a power level, such as the external device's power level and/or the primary device UE's power level, some embodiments provide arrangements for controlling the use of this external device towards the telecom communication services provided via the primary device UE, which is a SIM-based device. These telecom communication services may be provided via slices associated with such services.

Some embodiments provide for switching of slices as the UE is plugged in for power charging.

As described above, under the existing state of the art, a UE may be able to detect when it is connected to another power source. That is, as the UE is connected to a power charging source, the UE may be configured to perform a certain operation, such as switching from one or more slices to another set of slices.

It is possible that some slices lead to more battery drainage than others. Thus, in some embodiments, the UE may be configured to perform auto switching of slices when not in use. At the UE level, a UE can detect when it is idle i.e., with idle here means not executing any user task (e.g., background operations only), then the UE can determine to switch from one slice to another slice which consumes less power, i.e., a power savings slice. In some embodiments, the same can be reversed when the UE is, for example, physically plugged into a power charging source then the UE can determine to switch from e.g., a power savings slice to another more power consuming slice.

Some embodiments provide for switching of slices as the UE is plugged for power charging i.e., when the UE is connected to another power source for charging. Some embodiments provide for a slice transition at the UE, to and from a battery saver mode to a battery charging mode. For example, when a UE (e.g., a UE smartphone) is being actively used by a user, its battery drains as per the usage of communication services. Such UE may be configured to select one or more slices as per usages of communication services. If this UE is idle i.e., not executing any user task, the UE can determine to switch to a selected slice which consumes less power.

At this point, if this UE is now plugged into to a power (an external power source) for charging by the user, then the power level will again start rising due to charging. Then, the UE can determine to switch back to an earlier selection of slices as it is now attaining a required power level to support those slices/services.

In some embodiments, if a wireless Bluetooth device is charging (e.g., plugged into a power source) and is also connected to a SIM-based UE (e.g., smartphone), the Bluetooth connection to this UE and the communication over select slices (using select services) at the UE is controlled as per the Bluetooth device power level, e.g., a slice can also be switched if this external device is connected to a power source and its power level is rising.

In one example scenario, a Bluetooth device (e.g. wireless speaker) is being used by a user and is connected to a primary device (i.e., SIM-based UE). If the Bluetooth speaker's power level is insufficient (e.g., reaches or falls below a threshold power level), the speaker will not provide a good audio experience to the end user i.e., it will disconnect today and the audio experience via the speaker is not possible when the user wants to listen to music over the Bluetooth speakers. However, in some embodiments of the present disclosure, the Bluetooth speaker power level is insufficient, and the user configured task i.e., listening to streaming music via the speaker is not possible. In this scenario, since the Bluetooth device power level is not enough such that the external device may disconnect, the slice can be switched by the UE to a different slice (i.e., different than the slice providing the audio service), since the external device used for the application (e.g., audio app associated with the Bluetooth streaming) does not have enough power to support this application.

Now, if the user was streaming music and listening via the Bluetooth speakers, and notices that the power level is less, and starts charging it and lets the device run, then the UE may determine to not perform the slice switch since the device is fulfilling the power level criteria.

Thus, in some embodiments of the present disclosure, the benefits may be that if the secondary device is charging and being used, then some slice can remain turned ON (or enabled) at the primary device UE, since the secondary device fulfills the power level criteria to carry out the task (i.e., use services over the slice).

In short, currently there lies a gap in 3$^{rd}$ Generation Partnership Project (3GPP) 5$^{th}$ Generation (5G) ecosystem. Some embodiments of the present disclosure may address such gap by providing arrangements for controlling rules (e.g., user-selected rules, power savings rules at the UE, UE route selection policy (USRP) rules at the UE per user choice, etc.). In some embodiments, rules may be provided for controlling a high power consumption device (e.g., Bluetooth device) connections and its usage with respect to slices/services available at the UE based on defined, predetermined, user-selected, UE suggested, etc. power levels or a charging status of a device, e.g., UE and/or Bluetooth device.

Healthcare Use Case

Another use case which may potentially benefit from some embodiments of the present disclose is in the health care industry and more specifically, remote patient monitoring: Many of the issues in treating chronic patients could be reduced or resolved through more efficient patient care. Patient mismanagement leads to the need for otherwise preventable appointments. This in turn leads to greater strain on healthcare professionals' time, increased healthcare spending and longer waiting times for patients who require treatment.

Remote patient monitoring is seen as a solution to this problem. By using sensors, wearables and e-health devices, patient attributes can be collected and analyzed without the need for patients to travel to primary care facilities and have a face to face appointment with a medical professional.

As of today, the following wearable technologies—such as smart watches, fitness trackers and virtual reality (VR)

headsets—can be used for a variety of purposes including phone calls/texts, easy access to mobile apps and personal health monitoring.

Different wearable devices available today include:

Fitness tracker (e.g., Fitbit Charge, Garmin Vivosmart);

Smart watch (e.g., Apple Watch, Samsung Gear);

Smart earbuds (e.g., in-ear wireless headphones featuring digital assistants/audio augmentation);

Dedicated health monitor device (e.g., blood pressure, blood glucose, heart rate, respiration rate, sleep);

Virtual reality (VR) headset (excluding cardboard/phone-based viewers) (e.g., Sony PSVR, Oculus Go/Rift, HTC Vive);

Personal safety device (e.g., location tracking, emergency alert bands);

Smart footwear (e.g., shoes with sensors to monitor distance);

Smart glasses/augmented reality (AR) headset (e.g., Magic Leap One);

Smart clothing (e.g., shirt with sensors to monitor heart rate, workout effectiveness); and Smart jewelry (e.g., rings, necklaces, clip-ons).

Today, the following functionalities may be considered useful in a wearable device (such as smart watch) purchasing decision:

Fitness monitoring (e.g., activity tracking, workout detection);

Health tracking (e.g., heart rate monitoring, EKG, breathing tracking);

Sending/receiving text messages;

Making/receiving phone calls;

Water resistance;

Wireless connectivity (e.g., Bluetooth, Wi-Fi);

Sleep tracking;

Calendar/scheduling features;

GPS navigation;

Getting news/weather;

Standalone cellular connection (i.e., functions without relying on smartphone);

Sending/receiving email;

First-party apps (e.g., Apple Messages, Garmin Connect, Google Fit);

Digital assistant (e.g., Siri, Bixby, Google Assistant);

Emergency notifications;

Listening to music;

Making mobile payments;

Live tracking (e.g., letting others know where you are while on the move);

Smart coach-type features (e.g., workout analysis tools, real-time voice coaching);

Third-party apps (e.g., Sleep As Android, Spotify, Uber);

Location tracking (e.g., letting others know where you have been recently); and

Fertility tracking.

According to one study, the following device-related factors were most important in a smart watch purchasing decision:

Compatibility with the user's other devices;

Battery life;

Aesthetics/design/user interface;

Cost;

Size;

Durability/resilience/quality of wristband;

Touchscreen;

Privacy/who has access to my data;

Screen resolution; and

Availability of third-party apps.

According to one study, the following are health-related features that were most important in a fitness tracker purchase decision:

Pedometer/step tracking;

Heart rate monitoring;

Sleep tracking;

Tracking other physical activity (e.g., biking, weight training);

Blood pressure monitoring;

Weight tracking;

Fitness challenges with other users;

Smart coach-type features (e.g., workout analysis tools, real-time voice coaching);

Diet/nutrition tracking; and

Automatically send relevant data to the user's healthcare provider.

A wearable UE can be either SIM-based, or Bluetooth based which is connected via a Bluetooth connect to a SIM-based primary user UE (like a smartphone). That is, it can act as a primary device (in SIM-based embodiment) or as a secondary device (in Bluetooth based embodiment).

Some embodiments of the present disclosure may provide arrangements in which based on the power level of the wearable device or the power charging status, different slices can be configured to be available as per e.g., the choice of an admin user.

For example, when the battery level of the wearable device UE (such as smart watch) falls below a certain power level, a slice meant for emergency notifications should be available and is given precedence over any slices meant for streaming music services and so on. This may allow the admin to manage the usage of wearable devices towards different network slices as per the wearable device UE's power level or its power charging status (if plugged into a power source).

Before describing in detail exemplary embodiments, it is noted that the embodiments reside primarily in combinations of apparatus components and processing steps related to controlling device usage with respect to slices. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises." "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

In some embodiments, the term "node" is used herein and can be any kind of network node, such as, a mobility management node (e.g., Mobility Management Entity (MME) and/or Access and Mobility Function (AMF)), a gateway node (e.g., access gateway), a session management node (e.g., session management function (SMF) node), a user plane function (UPF) node, an AS node or any network node. In some embodiments, the network node may be, for example, a subscriber database node (e.g., unified data repository (UDR), home subscriber server (HSS)), a core network node, a Fifth Generation (5G) and/or New Radio (NR) network node, an Evolved Packet System (EPS) node, an Internet Protocol (IP) Multimedia Subsystem (IMS) node, a Proxy-Call Session Control Function (P-CSCF) node, an Serving-CSCF node, an Interrogating-CSCF node, a network repository function (NRF) node, a unified data management (UDM) node, a Network Exposure Function (NEF) node, a home location register (HLR) node, etc.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a UE or a radio network node.

In some embodiments, the non-limiting terms wireless device (WD) or a user equipment (UE) are used interchangeably. The UE herein can be any type of wireless device capable of communicating with a network node or another UE over radio signals. The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

A node described herein may include physical components, such as processors, allocated processing elements, or other computing hardware, computer memory, communication interfaces, and other supporting computing hardware. The node may use dedicated physical components, or the node may be allocated use of the physical components of another device, such as a computing device or resources of a datacenter, in which case the node may be said to be virtualized. A node may be associated with multiple physical components that may be located either in one location, or may be distributed across multiple locations.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices corresponding to a table, and/or one or more bit patterns representing the information.

In some embodiments, the term "obtain" or "obtaining" is used herein and may indicate obtaining in e.g., memory such as in the case where the information is predefined, preconfigured or otherwise already stored in a UE's memory. The term "obtain" or "obtaining" as used herein may also indicate obtaining by receiving signaling indicating the information obtained.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note also that some embodiments of the present disclosure may be supported by standard documents disclosed in Third Generation Partnership Project (3GPP) technical specifications. That is, some embodiments of the description can be supported by the above documents. In addition, all the terms disclosed in the present document may be described by the above standard documents.

A service generally corresponds to a source, or a sink, for specified data communications that is available on the network. Accessing a service may involve communication between multiple endpoints that are connected to the network. A service may be provided by a network operator, or may be provided by a network customer such as a business, utility, government, or other organization. Examples of services include, but are not limited to, providing audio and/or video content to stream or download to an endpoint such as a UE, storage and/or processing of data from an endpoint such as a UE, UE-to-UE messaging services, machine-to-machine communications, remote data storage, and/or remote computing services.

A network slice generally corresponds to a set of network resources which have been allocated to support at least one specific service on the network. Such network resources may include cloud-based communication resources, computing and memory resources, physical connection and communication resources, and wireless radio access resources such as frequency, time, spatial and code multi-access resources. A UE attempting to access to a service, may attempt to connect directly to that service, or in some embodiments to a network slice that supports that service.

It should be understood that the rules, slice types and/or messages discussed in the present disclosure may have any name and may not be limited to the specific names used herein, which may be exemplary and/or descriptive, such as, “power saving rule” or “power saving slice” or “non-power savings slice”, since the rule or slice type may, for example, be given another name in a technical specification, such as a 3GPP Technical Specification (TS) even though the use/function is as disclosed in the present disclosure.

Note further, that functions described herein as being performed by a UE or a network node may be distributed over a plurality of UEs and/or network nodes. In other words, it is contemplated that the functions of the network node and UE described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements for controlling device usage with respect to slices.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first UE 22*a* located in coverage area 18*a* is configured to wirelessly connect to, or be paged by, the corresponding network node 16*a*. A second UE 22*b* in coverage area 18*b* is wirelessly connectable to the corresponding network node 16*b*. While a plurality of UEs 22*a*, 22*b* (collectively referred to as UEs 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN.

A UE 22 is configured to include a power saving unit 24 which is configured to obtain a power saving rule, the power saving rule being based at least in part on power consumption metrics related to use of at least one application on at least one slice by the UE and/or by a device connected to the UE; and determine that a power saving slice should be used for a first application of the at least one application and/or the device connected to the UE based at least in part on (i) the obtained power saving rule and (ii) a current power state at the UE and/or at the device connected to the UE. A UE 22 is configured to include a session establishment unit 26 which is configured to establish a protocol data unit, PDU, session using the power saving slice.

Example implementations, in accordance with an embodiment, of the UE 22 and network node 16 discussed in the preceding paragraphs will now be described with reference to FIG. 2.

The communication system 10 includes a network node 16 provided in a communication system 10 and including hardware 28 enabling it to communicate with the UE 22. The hardware 28 may include a radio interface 30 for setting up and maintaining at least a wireless connection 32 with a UE 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16.

The communication system 10 further includes the UE 22 already referred to. The UE 22 may have hardware 44 that may include a radio interface 46 configured to set up and maintain a wireless connection 32 with a network node 16 serving a coverage area 18 in which the UE 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the UE 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 56, which is stored in, for example, memory 54 at the UE 22, or stored in external memory (e.g., database, storage array, network storage device, etc.) accessible by the UE 22. The software 56 may be executable by the processing circuitry 50. The software 56 may include a client application 58. The client application 58 may be operable to provide a service to a human or non-human user via the UE 22.

The processing circuitry 50 may be configured to control any of the methods and/or processes described herein and/or to cause such methods, and/or processes to be performed, e.g., by UE 22. The processor 52 corresponds to one or more processors 52 for performing UE 22 functions described herein. The UE 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to UE 22. For example, the processing circuitry 50 of the UE 22 may include power saving unit 24 which is configured to perform the techniques associated with power saving disclosed herein and session establishment unit 26 which is configured to establish the PDU session according to the techniques disclosed herein.

Figure 2:
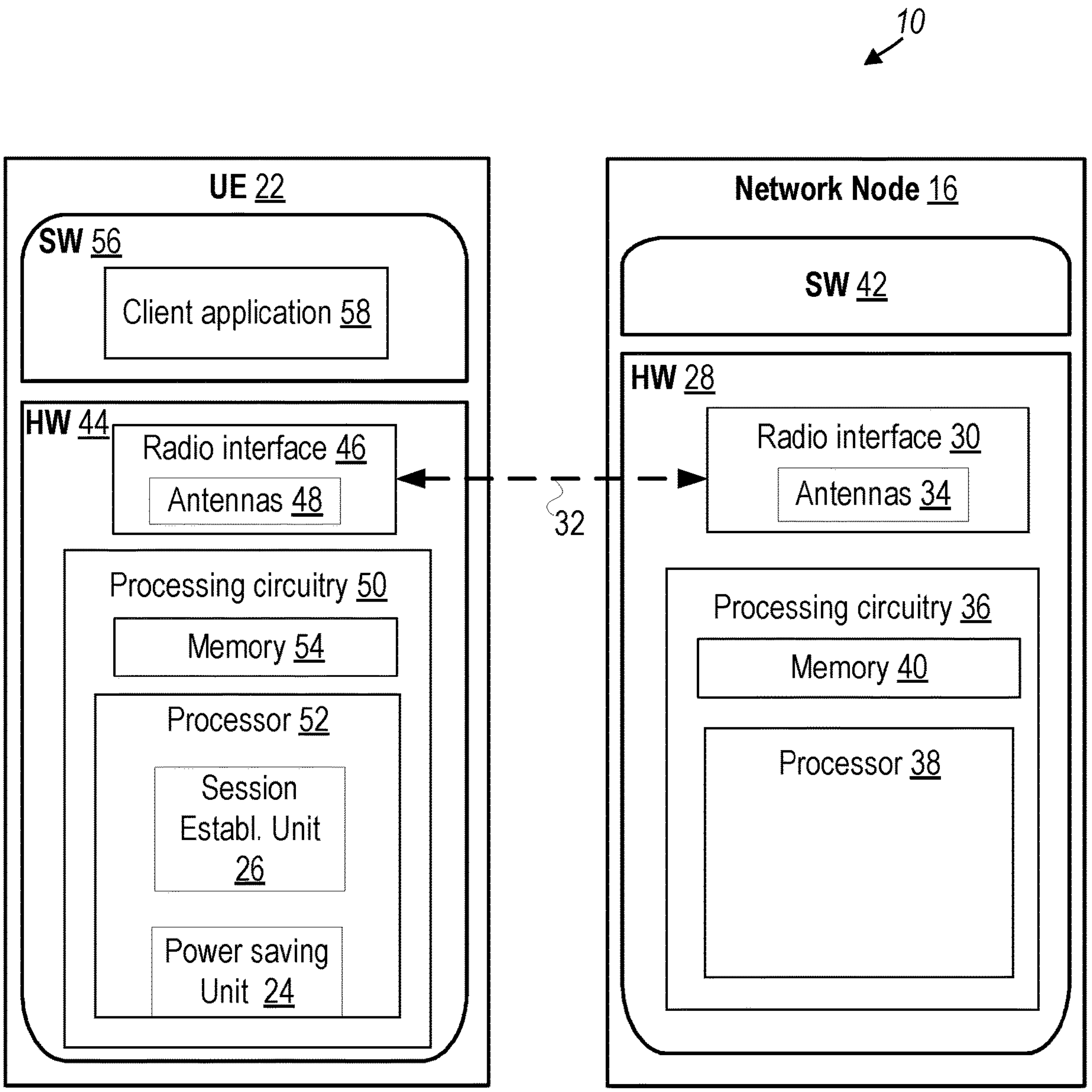
FIG. 2 is a block diagram of a network node communicating with a UE over an at least partially wireless connection according to some embodiments of the present disclosure.

In some embodiments, the inner workings of the network node 16 and UE 22 may be as shown in FIG. 2 and independently, the surrounding network topology may be that of FIG. 1.

The wireless connection 32 between the UE 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as power saving unit 24 and session establishment unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
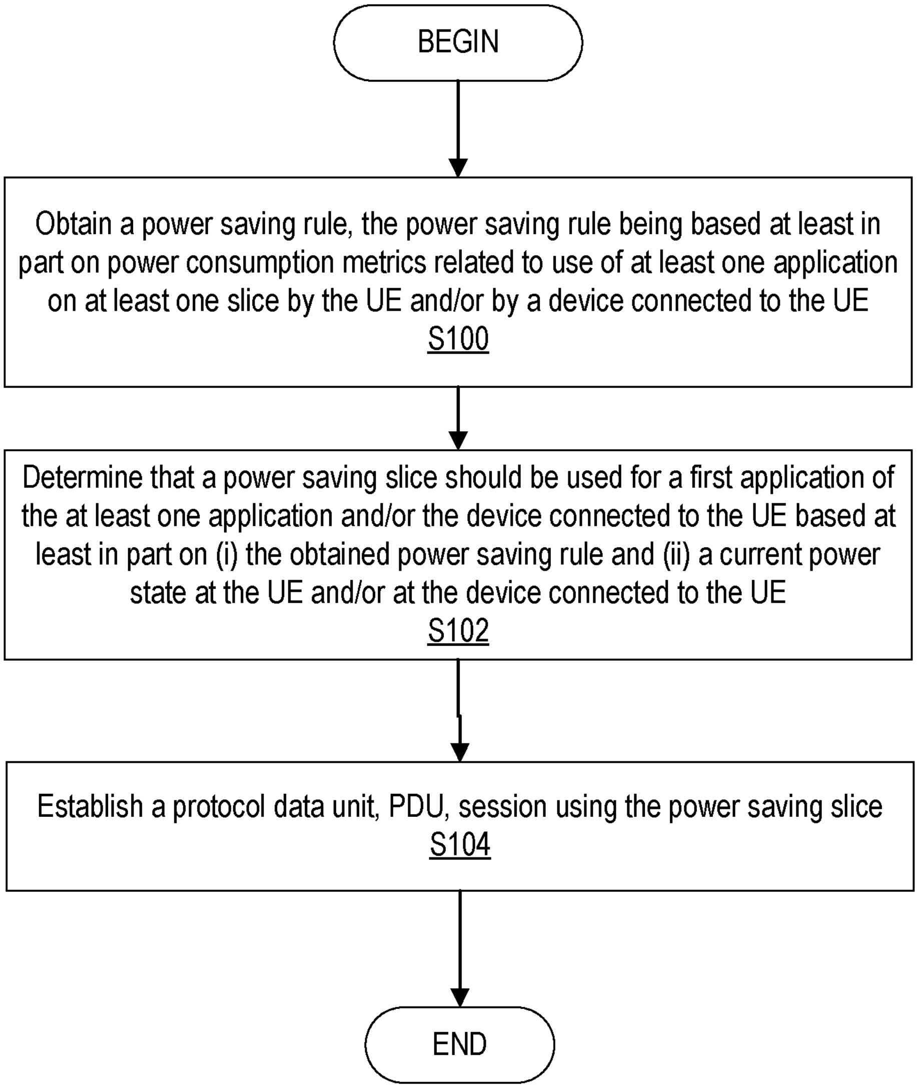
FIG. 3 is a flowchart of an exemplary method for a UE according to one embodiment of the present disclosure.

FIG. 3 is a flowchart of an example process in a UE 22 according to some embodiments of the present disclosure. One or more blocks described herein may be performed by one or more elements of UE 22 such as by one or more of processing circuitry 50 (including the power saving unit 24 and session establishment unit 26), processor 52, and/or radio interface 46. UE 22 such as via processing circuitry 50 and/or processor 52 and/or radio interface 46 is configured to obtain (Block S100) a power saving rule, the power saving rule being based at least in part on power consumption metrics related to use of at least one application on at least one slice by the UE and/or by a device connected to the UE. UE 22 such as via processing circuitry 50 and/or processor 52 and/or radio interface 46 is configured to determine (Block S102) that a power saving slice should be used for a first application of the at least one application and/or the device connected to the UE based at least in part on (i) the obtained power saving rule and (ii) a current power state at the UE and/or at the device connected to the UE. UE 22 such as via processing circuitry 50 and/or processor 52 and/or radio interface 46 is configured to establish (Block S104) a protocol data unit, PDU, session using the power saving slice.

In some embodiments, the current power state is based on at least one of: a current battery power level at the UE and/or the device; and whether the UE and/or the device is currently being charged by an external power source. In some embodiments, UE 22 such as via processing circuitry 50 and/or processor 52 and/or radio interface 46 is configured to detect that the current battery power level meets or exceeds a pre-determined threshold power level; and establish the PDU session using the power saving slice as a result of the detection. In some embodiments, UE 22 such as via processing circuitry 50 and/or processor 52 and/or radio interface 46 is configured to provide a user interface configured to allow a user of the UE to select the power saving slice; receive a user input via the user interface to select the power saving slice; and establish the PDU session using the selected power saving slice.

In some embodiments, the providing the user interface configured to allow the user to select the power saving slice is a result of detecting that the current battery power level meets or exceeds a pre-determined threshold power level. In some embodiments, UE 22 such as via processing circuitry 50 and/or processor 52 and/or radio interface 46 is configured to establish the PDU session using the power saving slice by being configured to determine to terminate a first existing PDU session that is using a non-power saving slice; and re-establish a second PDU session using the power saving slice, the terminated and re-established PDU sessions being associated with the first application and/or the device connected to the UE.

In some embodiments, UE 22 such as via processing circuitry 50 and/or processor 52 and/or radio interface 46 is configured to establish the PDU session using the power saving slice by being configured to determine to initiate a new PDU session for the first application and/or the device connected to the UE; and establish the new PDU session using the power saving slice, the new PDU session being associated with the first application and/or the device connected to the UE. In some embodiments, UE 22 such as via processing circuitry 50 and/or processor 52 and/or radio interface 46 is configured to obtain the power saving rule by being configured to as a result of the detection that the current battery power level meets or exceeds a pre-determined threshold power level, obtain the power saving rule that is associated to the pre-determined threshold power level that is met or exceeded.

In some embodiments, UE 22 such as via processing circuitry 50 and/or processor 52 and/or radio interface 46 is configured to determine that the power saving slice should be used for the first application by being configured to identify a non-power saving slice currently being used by a first existing PDU session for the first application that is associated to the power saving rule; and switch the first application from the non-power saving slice to the power saving slice according to the power saving rule by terminating the first existing PDU session that is using the non-power saving slice and re-establishing a second PDU session using the power saving slice. In some embodiments, the power saving slice is associated with a lower power consumption at the UE and/or the device connected to the UE, as compared to a power consumption associated with the non-power saving slice.

In some embodiments, the power saving slice is associated with the lower power consumption based at least in part on the power consumption metrics. In some embodiments, UE 22 such as via processing circuitry 50 and/or processor 52 and/or radio interface 46 is configured to determine that the power saving slice should be used for the first application by being configured to identify a non-power saving slice currently being used by a first existing PDU session for the first application that is associated to the power saving rule; and determine to terminate the first existing PDU session that is using the non-power saving slice and to forgo re-establishment of a second PDU session for the application to reduce power consumption at the UE and/or the device connected to the UE.

In some embodiments, UE 22 such as via processing circuitry 50 and/or processor 52 and/or radio interface 46 is configured to determine that the power saving slice should be used for the first application by being configured to identify a non-power saving slice currently being used by a first existing PDU session for the first application that is associated to the power saving rule; and determine to terminate a second existing PDU session for a second application using the non-power saving slice to reduce power consumption at the UE and/or the device connected to the UE, while continuing the first existing PDU session for the first application using the non-power saving slice. In some embodiments, the power saving rule at least one of: is a local UE rule; is based further on at least one of a UE route selection policy, URSP, from a policy control function, PCF, and a URSP pre-configured in the UE; and is application-specific and slice-specific.

In some embodiments, the power consumption metrics are related to historical use by the UE and/or the device of the at least one application on the at least one slice. In some embodiments, UE 22 such as via processing circuitry 50 and/or processor 52 and/or radio interface 46 is configured to continuously monitor the power consumption metrics of the UE and/or the device; and modify the power saving rule based at least in part on a result of the monitoring. In some embodiments, the device is a Bluetooth device connected to the UE and the power consumption metrics are related to historical use of the at least one application on the at least one slice by the Bluetooth device.

In some embodiments, UE 22 such as via processing circuitry 50 and/or processor 52 and/or radio interface 46 is configured to, as a result of the current battery power level of the Bluetooth device meeting or exceeding a pre-determined threshold power level, determine that the power saving slice should be used for the first application by being configured to identify a non-power saving slice currently being used by a first existing PDU session for the first application that is associated to the power saving rule; and one of: switch the first application from using the non-power saving slice to using the power saving slice to reduce power consumption at the Bluetooth device; terminate the first existing PDU session that is using the non-power saving slice and re-establishing a second PDU session using the power saving slice to reduce power consumption at the Bluetooth device; determine to terminate the first existing PDU session that is using the non-power saving slice and to forgo re-establishment of a second PDU session for the application to reduce power consumption at the Bluetooth device; and determine to terminate a second existing PDU session for a second application using the non-power saving slice to reduce power consumption at the Bluetooth device, while continuing the first existing PDU session for the first application using the non-power saving slice.

Having generally described arrangements for controlling device usage with respect to slices, functions and processes are provided as follows, and which may be implemented by the network node 16, and/or UE 22.

Some embodiments of the present disclosure provide arrangements for one or more new local UE 22 (device) power and battery specific rules, related to the power consumption by e.g., applications at the UE 22, and 5-tuple Internet Protocol (IP) flows over the slices (identified by single network slice selection assistance information (S-NSSAIs)) such applications use. Some embodiments provide that the UE 22 is configured to offer e.g., battery optimization suggestions to the end user via e.g., a user interface at the UE 22. The end user can then decide whether to allow the UE 22 to configured with one or more of the optimization suggestions when the UE 22 provides the end user with optimization options to extend battery life.

The rules described herein, such as the local UE rules may be created by the UE 22 (device) based on network policies/rules, such as URSPs as well as locally configured policies/rules, such as locally configured USRP rules. The rules may assist the UE 22 to capture (through e.g., monitoring over time) battery power consumption by the applications/IP flows (which may be mapped from traffic descriptors in URSP rules or other policies/rules) used by the UE 22 and the slices that are being used by the various applications/IP flows at the UE 22.

The rules described herein, such as the local UE rules may be configured to instruct the UE 22 to collect information about battery power consumption (e.g., by applications/services/slices) at the UE 22 over time (i.e., historical data collection) and can assist the end user to manage battery power consumption under certain conditions, i.e., when battery power level is low, when the device (UE 22 or external connected device) is not being charged and/or when the slice consumption for certain applications are extremely taxing on the battery power of the device. To that effect, in some embodiments, the UE 22 may be configured to provide (e.g., via audio suggestion, display or a settings option) power optimization options to the end user and the end user may select to allow the UE 22 to implement these options or not.

In some embodiments, one or more of the power consumption and/or battery rules may assume that some applications, and/or IP flows can run on multiple slices and there are policies, e.g., network URSP or local URSP rules governing that. In some embodiments, this may enable the UE 22 battery power derived rules from being able to provide the end user optimization options for example when the device (UE 22 and/or external connected device) battery power is low.

Table 1 below provides an example of the local UE rules, which may be derived from network or local policies (e.g., URSP), or policies configured in the device, which the UE 22 may use to create a hysteresis of battery consumption of the application/IP flows over the one or more slices/S-NSSAIs that such applications/IP flows use at the UE 22.

TABLE 1

Example of local UE rules based on policies/rules (e.g., network and configured URSP rules at the UE).

| S-NSSAI used | Applications | List of Traffic descriptors |
|---|---|---|
| S-NSSAI1 | Application1 | |
| S-NSSAI2 | Application1 | |
| S-NSSAI2 | Application2 | |
| S-NSSAI3 | | 5-Tuples IP Flow 1 |

Table 1 shows that Application 1 can run on slice S-NSSAI1 or S-NSSAI2. Application 2 can run on slice S-NSSAI2 and that a 5-tuple IP Flow 1 runs on slice S-NSSAI3.

The hysteresis and/or historical data about battery power consumption may be collected over time and based on the above Table 1, the UE 22 can propose power optimization options to the end user. The optimization options may focus on the S-NSSAIs being used and for each one recommends whether an application and/or IP flow should be downgraded to a lower performing slice, if possible and available (such as a power saving slice, e.g., a slice that consumes less power than another slice that the application/IP flow is able to also use). In some embodiments, under certain cases, the UE 22 may recommend a particular slice usage be completely stopped, or a subset of running applications/IP flows be stopped. The triggers for when to provide optimization options to the end user for action may in some embodiments depend on the battery power consumption (e.g., per application/IP flow/slice battery power consumption historical data).

Table 2 below shows an example of Table 1 extended with triggers for some optimization options to be provided to the end user via the UE 22 under certain battery conditions, as well as the options:

TABLE 2

Example power optimization options

| S-NSSAI used | Applications | List of Traffic descriptors | Battery power level Trigger for Action | Device charging Status | Optimization Option |
|---|---|---|---|---|---|
| S-NSSAI1 | Application 1 | | 80% | Not being Charged | Switch to S-NSSAI2 (power saving slice) |
| S-NSSAI2 | Application 1 | | 50% | Not being Charged | Propose to stop completely, or continue with application 1 but suspend Application 2 |
| S-NSSAI2 | Application 2 | | 50% | Not being Charged | Continue with application 2 but suspend Application 1 |
| S-NSSAI3 | | 5-Tuples IP Flow 1 | | | |

In the example Table 2, the last three columns include the options proposed by the UE 22 as well as the conditions that are associated with the corresponding power saving option (current device charging status and current battery power level trigger) using the techniques described herein. The conditions, such as the power trigger values shown in Table 2 are non-limiting examples. The optimization options may, in some embodiments, depend on what is running in the S-NSSAI, and the consumption therein.

In some embodiments, there can be multiple entries for the same application for various power levels, for example, a first option at a lower power level threshold to switch to a power saving slice (less power consuming slice as compared to one or more other slices available for use at the UE 22), and a higher power level threshold to disable slice usage completely as optimization options.

For downgrading applications, in some embodiments, the end user selects or determines to allow the UE 22 to implement a particular option that will be identified as the power saving slice/downgraded S-NSSAI to be used by one or more particular applications when such a threshold (e.g., power level threshold) is reached. This power saving slice/downgraded S-NSSAI should be allowed to be used by the UE 22 and as such some embodiments may require the end user to always verify that the particular suggested S-NSSAI can be used instead of e.g., a subscribed/configured S-NSSAI.

Figure 4:
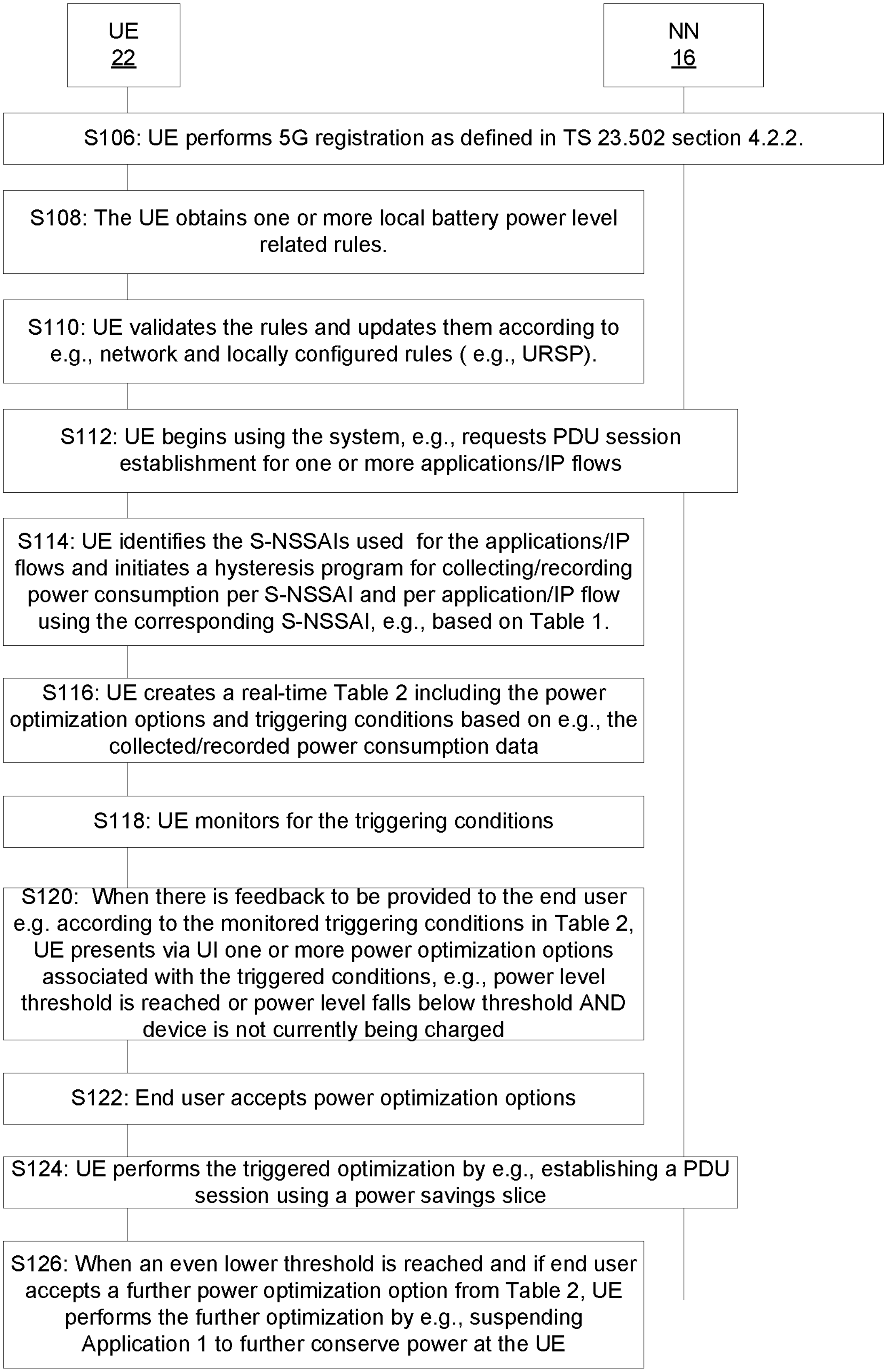
FIG. 4 is a flow diagram illustrating an example method according to one embodiment of the present disclosure.

FIG. 4 shows an example call flow diagram. The call flow depicts an example of how UE power related rules may interwork with network (e.g., URSP, or other network policies) rules in a 5G environment based on the techniques disclosed. Details of the steps are included in the call flows and based on the above description.

S106: UE 22 registers to the network (e.g., 5G system) via network node 16 (e.g., AMF via RAN).

S108: UE 22 obtains one or more local battery power related rules. For example, UE 22 may create the local battery power related rules based on the network/local rules (e.g., URSP rule) at the UE 22. The UE 22 may create e.g., Table 1 based on the local UE 22 power related rules. If the one or more local battery power related rules are already created, the UE 22 may obtain them from its own memory or from signaling received from another device or node.

S110: UE 22 validates the obtained rules and/or updates them according to e.g., network and locally configured rules (e.g., URSP). The local battery power related rules may be updated when the network updates the UE 22 with network rules/policies e.g., from a policy control function.

S112: UE begins using the system, e.g., requests a PDU session establishment for one or more applications/IP flows.

S114: UE 22 identifies the S-NSSAIs used for the applications/IP flows and initiates a hysteresis program for collecting/recording power consumption data (power consumptions metrics) per S-NSSAI and per application/IP flow using the corresponding S-NSSAI, e.g., based on Table 1.

S116: UE 22 creates a real-time table, e.g., Table 2 including the power optimization options and triggering conditions based on e.g., the collected/recorded power consumption data.

S118: UE 22 monitors for the triggering conditions, e.g., UE's 22 current charging status/state and/or device battery power level.

S120: When there is feedback to be provided to the end user e.g. according to the monitored triggering conditions in e.g., Table 2, UE 22 presents one or more power optimization options associated with the triggered conditions, e.g., power level (e.g., at UE 22 and/or external device) threshold is reached or power level falls below threshold and/or device (e.g., UE 22 and/or external device) is not currently being charged.

S122: End user accepts power optimization options. If the end user does not accept the power optimization options, UE 22 does not apply them.

S124: If the end user accepts the power optimization options, UE 22 performs the triggered optimization such as by establishing a PDU session using a power savings slice. In one example using the example information in Table 2, when current battery power level (e.g., at UE 22) reaches or falls below 80% AND the device (e.g., UE 22) is not currently being charged, UE 22 switches Application 1 from using S-NSSAI1 to using the power saving slice S-NSSAI2 by establishing a PDU session for Application 1 using S-NSSAI2. UE 22 may also terminate the current PDU session for Application 1 that is using S-NSSAI1.

UE 22 continues to monitor for the triggering conditions in case further power optimizations can be implemented.

S126: For example, when an even lower threshold is reached and if the end user accepts a further power optimization option, UE 22 performs the further optimization. In one example using the example information in Table 2, when current battery power level (e.g., at UE 22) reaches or falls below 50% AND the device (e.g., UE 22) is not currently being charged, UE 22 continues using slice S-NSSAI2 for Application 2 and also suspends (e.g., terminates) use of Application 1 at the UE 22 altogether to further conserve power at the UE 22. For example, Application 1 may be determined by the UE 22 to be a recreational or large power consumption application (e.g., gaming app) and therefore may be suspended when power levels drop to a very low level; while Application 2 may be considered a less power consuming application per the hysteresis program (e.g., document editing application) and therefore may be allowed to continue even when the UE 22 is at very low power levels.

In some embodiments, when the power level reaches or rises above the threshold and/or the UE 22 enters a power charging state, the UE 22 may return to a previous state before the power saving rule was applied, e.g., the suspended application may be allowed to be used and/or a PDU session that was previously terminated for a suspended application may be re-established with e.g., a non-power savings slice.

In all of the above, the UE 22 should verify network provided or pre-configured URSP rules, and any time such network/configured rules get updated the UE 22 should adjust the local power related rules (e.g., Table 1 and/or 2 information) for any changes in the S-NSSAIs, applications/IP flows, etc. that may impact power related rules.

The one or more local battery power related rules and/or the power optimization options and associated triggering conditions disclosed may be more generally referred to as "power saving rules".

External Connected Devices

In some embodiments, the local power related rules disclosed may also be deployed for external connected devices such as Bluetooth devices, connected to a UE 22, to provide the same power saving benefit for Bluetooth devices as the UE 22 itself when it comes to power optimization. One aim is to identify alternative options for applications utilized by Bluetooth devices when the power consumption is high and offer options for other slices that can be used by these applications in order to reduce power consumption by the Bluetooth devices.

Figure 5:
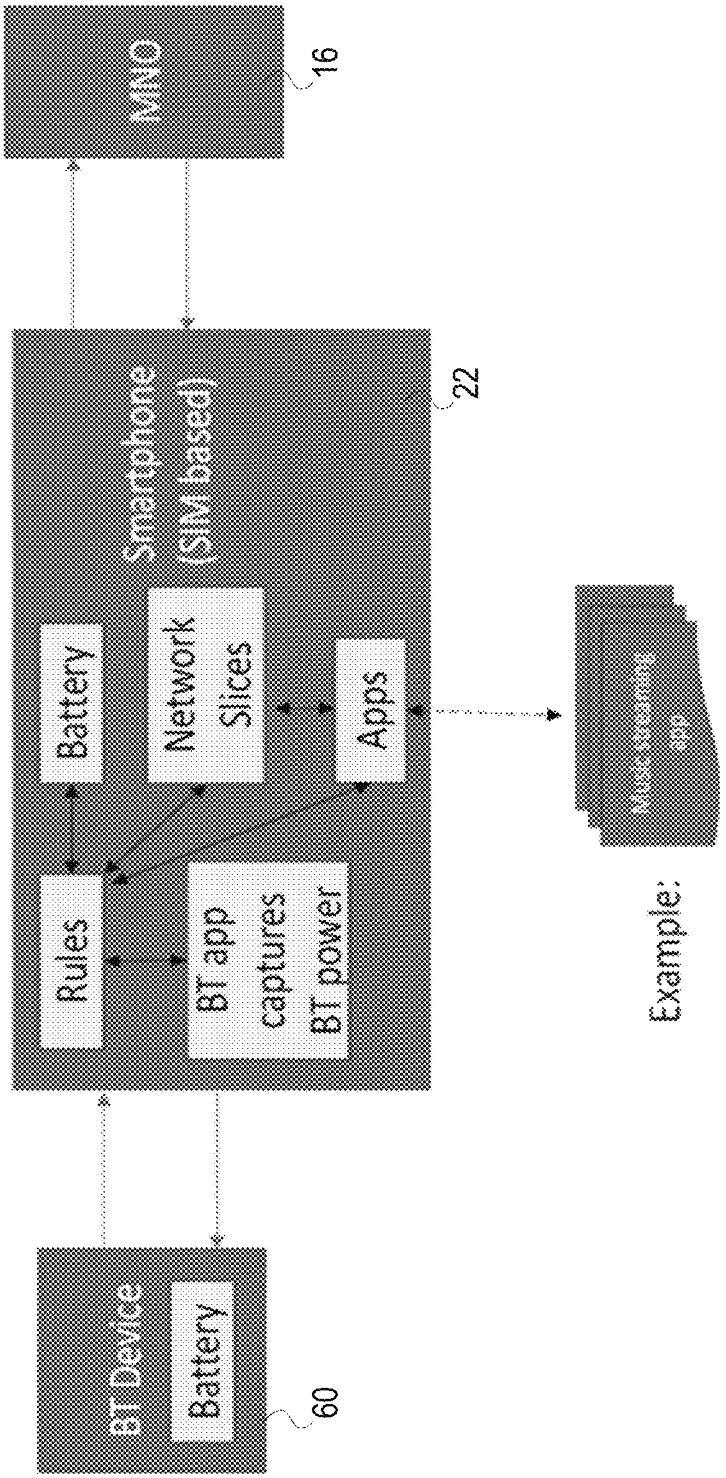
FIG. 5 is a schematic diagram illustrating an example arrangement according to an alternative embodiment of the present disclosure.

FIG. 5 depicts an example of how a Bluetooth device 60 (also referred to in FIG. 5 as "BT") may be monitored by a UE 22 through applications measuring the power consumption. The UE 22 may include a Bluetooth application that captures the power consumption data in relation to applications running on a specific S-NSSAI, and for which the Bluetooth device 60 is being used.

The rule depicting this consumption may be another entry in a modified Table 1 as shown below, which shows if the entry relates to the UE 22 itself or a Bluetooth device 60 used for an application, in this case associated with Application 3 running on S-NSSAI2 as an example.

TABLE 3

Example of a modified Table 1 including a Device type column.

| S-NSSAI used | Applications | List of Traffic descriptors | Device |
|---|---|---|---|
| S-NSSAI1 | Application 1 | | UE |
| S-NSSAI2 | Application 1 | | UE |
| S-NSSA2 | Application 3 | | Bluetooth |

This results in a modified version of the run-time application associated with Table 2 as shown below, which shows as optimization example that Application 3 should switch from using S-NSSAI2 to using a further power saving slice S-NSSAI3 (e.g., by establishing a PDU session using S-NSSAI3) to conserve Bluetooth device 60 power, when the Bluetooth device's 60 power falls below a certain threshold, e.g., 50%.

TABLE 4

Example of run-time table, e.g., modified Table 2 including power optimization options for multiple devices.

| S-NSSAI used | Applications | List of Traffic descriptors | Device | Battery power level Trigger for Action | Device charging Status | Optimization Option |
|---|---|---|---|---|---|---|
| S-NSSAI1 | Application1 | | UE | 80% | Not being Charged | Switch to S-NSSAI2 |
| S-NSSAI2 | Application1 | | UE | 50% | Not being Charged | Propose to stop completely, or continue with application 1 but suspend Application 2 |
| S-NSSA2 | Application3 | | Bluetooth | 50% | Not being Charged | Switch to S-NSSA1 3 to conserve Bluetooth power |

Some embodiments of the present disclosure provide arrangements for controlling the connection and usage of Bluetooth devices 60 (external secondary device) with respect to slices/services at a (primary) UE 22 per user approval or choice and based on external Bluetooth device 60 power level and/or Bluetooth device 60 charging status.

Although some embodiments may be described above as being implemented upon a user's approval, it is contemplated that such embodiments may be implemented upon a general user approval for the overall power optimization feature disclosed herein, which may configure the UE 22 to automatically implement power related rules upon triggering conditions and which may include merely notifying the end user that the particular power related rule was triggered and is now being implemented (so that the end user may switch off the overall power optimization feature if undesired).

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a user equipment, UE, the method comprising:

obtaining a power saving rule, the power saving rule being based at least in part on power consumption data collected by monitoring, over time, battery consumption by applications used by the UE and one or more slices of the applications, the one or more slices identified by single network slice selection assistance information, S-NSSAI;

selecting a power-saving slice determined based on detecting that a current battery power level meets or exceeds a predetermined threshold power level;

determining whether to use the selected power saving slice for a first application of one or both of applications and the device connected to the UE based at least in part on one or both of:

(i) the obtained power saving rule; and (ii) a current power state at the UE or a device connected to the UE; and configuring a protocol data unit, PDU, session using the selected power saving slice.

2. The method of claim 1, wherein the current power state is based on at least one of:

one or both of a current battery power level at the UE and the device; and whether the one or both of the UE and the device is currently being charged by an external power source.

3. The method of claim 1, further comprising:

detecting, based on the power saving rule associated to a pre-determined threshold power level, that the current battery power level meets or exceeds the pre-determined threshold power level; and establishing the PDU session using the power saving slice as a result of the detection.

4. The method of claim 1, further comprising:

providing a user interface configured to allow a user of the UE to select the power saving slice;

receiving a user input via the user interface to select the power saving slice; and establishing the PDU session using the selected power saving slice.

5. The method of claim 4, wherein providing the user interface configured to allow the user to select the power saving slice is a result of detecting, based on the power saving rule associated to a pre-determined threshold power level, that the current battery power level meets or exceeds the pre-determined threshold power level.

6. The method of claim 1, wherein establishing the PDU session using the power saving slice comprises:

determining to terminate a first existing PDU session that is using a non-power saving slice; and re-establishing a second PDU session using the power saving slice, the terminated and re-established PDU sessions being associated with one or both of the first application and the device connected to the UE.

7. The method of claim 1, wherein establishing the PDU session using the power saving slice comprises:

determining to initiate a new PDU session for one or both of the first application and the device connected to the UE; and establishing the new PDU session using the power saving slice, the new PDU session being associated with the first application and the device connected to the UE.

8. The method of claim 3, wherein obtaining the power saving rule comprises:

as a result of the detection, based on the power saving rule associated to a pre-determined threshold power level, that the current battery power level meets or exceeds the pre-determined threshold power level, obtaining the power saving rule that is associated to the pre-determined threshold power level that is met or exceeded.

9. The method of claim 8, wherein determining that the power saving slice should be used for the first application comprises:

identifying a non-power saving slice currently being used by a first existing PDU session for the first application that is associated to the power saving rule; and switching the first application from the non-power saving slice to the power saving slice according to the power saving rule by terminating the first existing PDU session that is using the non-power saving slice and re-establishing a second PDU session using the power saving slice.

10. The method of claim 6, wherein the power saving slice is associated with a lower power consumption at one or both of the UE and the device connected to the UE, as compared to a power consumption associated with the non-power saving slice.

11. The method of claim 10, wherein the power saving slice is associated with the lower power consumption based at least in part on the power consumption metrics.

12. The method of claim 8, wherein determining that the power saving slice should be used for the first application comprises:

identifying a non-power saving slice currently being used by a first existing PDU session for the first application that is associated to the power saving rule; and determining to terminate the first existing PDU session that is using the non-power saving slice and to forgo re-establishment of a second PDU session for the application to reduce power consumption at one or both of the UE and the device connected to the UE.

13. The method of claim 8, wherein determining that the power saving slice should be used for the first application comprises:

identifying a non-power saving slice currently being used by a first existing PDU session for the first application that is associated to the power saving rule; and determining to terminate a second existing PDU session for a second application using the non-power saving slice to reduce power consumption at one or both of the UE and the device connected to the UE, while continuing the first existing PDU session for the first application using the non-power saving slice.

14. The method of claim 1, wherein the power saving rule at least one of:

is a local UE rule;

is based further on at least one of a UE route selection policy, URSP, from a policy control function, PCF, and a URSP pre-configured in the UE; and is application-specific and slice-specific.

15. The method of claim 1, wherein the power consumption metrics are related to historical use by one or both of the UE and the device of the at least one application on the at least one slice.

16. The method of claim 1, further comprising:

continuously monitoring the power consumption metrics of one or both of the UE and the device; and modifying the power saving rule based at least in part on a result of the monitoring.

17. The method of claim 1, wherein the device is a Bluetooth device connected to the UE and the power consumption metrics are related to historical use of the at least one application on the at least one slice by the Bluetooth device.

18. The method of claim 17, wherein as a result of the current battery power level of the Bluetooth device meeting or exceeding a pre-determined threshold power level based on the power saving rule associated to the pre-determined threshold power level, the determining that the power saving slice should be used for the first application comprises:

identifying a non-power saving slice currently being used by a first existing PDU session for the first application that is associated to the power saving rule; and one of:

switching the first application from using the non-power saving slice to using the power saving slice to reduce power consumption at the Bluetooth device;

terminating the first existing PDU session that is using the non-power saving slice and re-establishing a second PDU session using the power saving slice to reduce power consumption at the Bluetooth device;

determining to terminate the first existing PDU session that is using the non-power saving slice and to forgo re-establishment of a second PDU session for the application to reduce power consumption at the Bluetooth device; and determining to terminate a second existing PDU session for a second application using the non-power saving slice to reduce power consumption at the Bluetooth device, while continuing the first existing PDU session for the first application using the non-power saving slice.

19. A user equipment, UE, comprising processing circuitry, the processing circuitry configured to cause the UE to:

obtain a power saving rule, the power saving rule being based at least in part on power consumption data collected by monitoring, over time, battery consumption by applications used by the UE and one or more slices of the applications, the one or more slices identified by single network slice selection assistance information, S-NSSAI;

select a power-saving slice determined based on detecting that a current battery power level meets or exceeds a predetermined threshold power level;

determine whether to use the selected power saving slice for a first application of one or both of applications and the device connected to the UE based at least in part on one or both of:

(i) the obtained power saving rule; and (ii) a current power state at the UE or a device connected to the UE; and configure a protocol data unit, PDU, session using the selected power saving slice.

20. A non-transitory computer-readable medium storing computer instructions executable by at least one processor to perform a method, the method comprising:

obtaining a power saving rule, the power saving rule being based at least in part on power consumption data collected by monitoring, over time, battery consumption by applications used by the UE and one or more slices of the applications, the one or more slices identified by single network slice selection assistance information, S-NSSAI;

selecting a power-saving slice determined based on detecting that a current battery power level meets or exceeds a predetermined threshold power level;

determining whether to use the selected power saving slice for a first application of one or both of applications and the device connected to the UE based at least in part on one or both of:

(i) the obtained power saving rule; and (i) a current power state at the UE or a device connected to the UE; and configuring a protocol data unit, PDU, session using the selected power saving slice.

* * * * *